United States Patent
Nomura

(10) Patent No.: US 11,982,342 B2
(45) Date of Patent: May 14, 2024

(54) BEVEL GEAR PAIR

(71) Applicant: MUSASHI SEIMITSU INDUSTRY CO., LTD., Toyohashi (JP)

(72) Inventor: Shuhei Nomura, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 18/272,688

(22) PCT Filed: Jan. 25, 2021

(86) PCT No.: PCT/JP2021/002425
§ 371 (c)(1),
(2) Date: Jul. 17, 2023

(87) PCT Pub. No.: WO2022/157968
PCT Pub. Date: Jul. 28, 2022

(65) Prior Publication Data
US 2024/0077136 A1    Mar. 7, 2024

(51) Int. Cl.
F16H 48/08 (2006.01)
F16H 1/28 (2006.01)
F16H 55/08 (2006.01)

(52) U.S. Cl.
CPC ........... F16H 48/08 (2013.01); F16H 1/2854 (2013.01); F16H 55/0813 (2013.01); F16H 55/088 (2013.01); *F16H 2048/087* (2013.01)

(58) Field of Classification Search
CPC .. F16H 48/08; F16H 2048/087; F16H 1/2854; F16H 55/0813; F16H 55/088
See application file for complete search history.

(56) References Cited

U.S. PATENT DOCUMENTS

| | | | |
|---|---|---|---|
| 1,811,446 A * | 6/1931 | Veber | B23F 1/06 74/459.5 |
| 6,080,199 A * | 6/2000 | Umeyama | F16H 55/088 703/2 |
| 8,402,659 B2 * | 3/2013 | Kotthoff | F16H 55/06 29/893.3 |
| 2010/0317483 A1* | 12/2010 | Radzevich | F16H 55/0846 74/462 |

FOREIGN PATENT DOCUMENTS

| | | |
|---|---|---|
| CN | 103821905 B | 5/2016 |
| JP | 2003-222201 A | 8/2003 |
| WO | 2012/027027 A2 | 3/2012 |

OTHER PUBLICATIONS

PCT/ISA/210 from International Application PCT/JP2021/002425.
IPRP & Written Opinion of the International Searching Authority for PCT/JP2021/002425.

* cited by examiner

*Primary Examiner* — Huan Le
(74) *Attorney, Agent, or Firm* — Carrier, Shende & Associates P.C.; Joseph P. Carrier; Fulchand P. Shende

(57) ABSTRACT

In a bevel gear pair, a first gear and a second gear are applied with tooth top modification, and a ratio of a distance from a pitch circle to a starting position of the tooth top modification to a distance from the pitch circle to a tooth top in the first gear is larger than a ratio of a distance from a pitch circle to a starting position of the tooth top modification to a distance from a pitch circle to a tooth top in the second gear. Thus, the bevel gear pair that can achieve smooth meshing is provided.

7 Claims, 6 Drawing Sheets

BEVEL GEAR PAIR

TECHNICAL FIELD

The present invention relates to a bevel gear pair comprising a first gear and a second gear that mesh with each other, the second gear having a larger number of teeth than the first gear. Each of the first gear and the second gear is applied with tooth top modification.

BACKGROUND ART

A technique of applying tooth top modification to gears of a gear pair that mesh with each other for quiet meshing of the gear pair has been conventionally known as disclosed, for example, in Patent Document 1.

PRIOR ART DOCUMENTS

Patent Documents

Patent Document 1: Japanese Unexamined Patent Application Publication No. 2003-222201

SUMMARY OF THE INVENTION

Problems to be Solved by the Invention

The technique of Patent Document 1 is a technique related to a spur gear constituting a planetary gear speed reducer, and is not studied specifically for gears of a bevel gear pair or studied by associating with each other the tooth top modification of the first gear and the second gear that mesh with each other. Therefore, it cannot be said that a study for achieving smooth meshing of the bevel gear pair has been made sufficiently.

The present invention was made in consideration of the above circumstances and has an object to provide a bevel gear pair that can achieve smooth meshing.

Means for Solving the Problems

In order to achieve the above object, the present invention has a first feature that, in a bevel gear pair comprising a first gear and a second gear that mesh with each other, the second gear having a larger number of teeth than the first gear, each of the first gear and the second gear is applied with tooth top modification, and a ratio of a distance from a pitch circle to a starting position of the tooth top modification to a distance from the pitch circle to a tooth top in the first gear is larger than the ratio in the second gear.

In addition to the first feature, the present invention has a second feature that the first gear is a pinion gear constituting a differential mechanism of a differential device, and the second gear is a side gear constituting the differential mechanism.

In addition to the first or second feature, the present invention has a third feature that a basic tooth profile of the first gear and the second gear is a spherical involute tooth profile or an octoid tooth profile.

In addition to any one of the first to third features, the present invention has a fourth feature that a modification amount of the tooth top modification of the second gear is larger than a modification amount of the tooth top modification of the first gear.

Effects of the Invention

In the bevel gear pair comprising the second gear having the larger number of the teeth than the first gear, the pitch circle of the second gear is located closer to the tooth top than the pitch circle of the first gear. When the starting position of the tooth top modification is too close to the pitch circle, a meshing ratio will decrease. Therefore, a region in the second gear where the tooth top modification can be applied is limited. According to the first feature of the present invention, the ratio of the distance from the pitch circle to the starting position of the tooth top modification to the distance from the pitch circle to the tooth top in the first gear is larger than the ratio in the second gear. Therefore, even under the circumstances that the region in the second gear where the tooth top modification can be applied is limited, it is possible to bring the starting position of the tooth top modification of the second gear closer to the pitch circle within the region, while distancing the starting position of the tooth top modification in the first gear from the pitch circle more than the starting position of the tooth top modification in the second gear. Consequently, an effect of the tooth top modification can be maximized while ensuring the meshing ratio of the bevel gear pair, so that smooth meshing is achieved.

According to the second feature of the present invention, the first gear is the pinion gear constituting the differential mechanism of the differential device, and the second gear is the side gear constituting the differential mechanism. Therefore, the effect of the tooth top modification can be maximized while ensuring a meshing ratio of the pinion gear and the side gear constituting the differential mechanism of the differential device.

According to the third feature of the present invention, the basic tooth profile of the first gear and the second gear is the spherical involute tooth profile or the octoid tooth profile. Thus, it is possible to ensure satisfactory meshing of the first gear and the second gear in a part where the modification is not applied.

According to the fourth feature of the present invention, the modification amount of the tooth top modification of the second gear is larger than the modification amount of the tooth top modification of the first gear. Therefore, even under the circumstances that the region in the second gear where the tooth top modification can be applied is limited as described above, the limitation of the region where the tooth top modification can be applied is compensated, so that the effect of the tooth top modification can be maximized.

EXPLANATION OF REFERENCE NUMERALS

G1, G2 . . . first and second gears, L1$a$ . . . distance from pitch circle to tooth top of the first gear, L1$b$ . . .

distance from pitch circle to starting position of tooth top modification of the first gear, L2a . . . distance from pitch circle to tooth top of the second gear, L2b . . . distance from pitch circle to starting position of tooth top modification of the second gear, P1 . . . pitch circle of the first gear, P2 . . . pitch circle of the second gear, R1 . . . starting position of tooth top modification of the first gear, R2 . . . starting position of tooth top modification of the second gear, T1 . . . tooth top of the first gear, T2 . . . tooth top of the second gear, m1 . . . modification amount of tooth top modification of the first gear, m2 . . . modification amount of tooth top modification of the second gear.

MODE FOR CARRYING OUT THE INVENTION

Hereinafter, an embodiment of the present invention is described based on the accompanying drawings.

Figure 1:
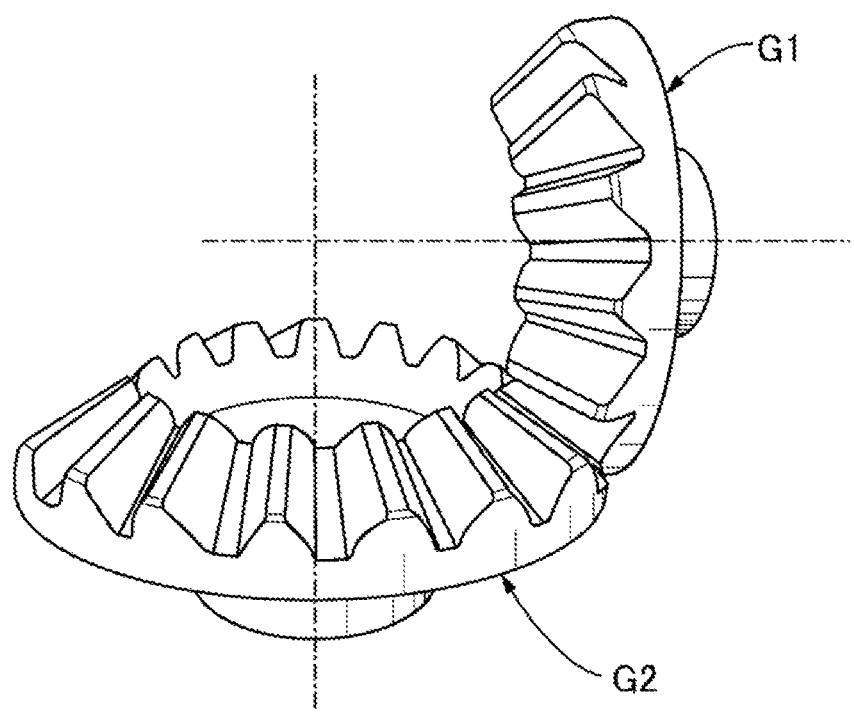
FIG. 1 is a perspective view showing a meshing state of a first gear and a second gear.

FIG. 1 shows a meshing state of a first gear G1 and a second gear G2 in a bevel gear pair of the present invention comprising the first gear G1 as a small diameter gear and the second gear G2 as a large diameter gear that mesh with each other, the second gear G2 having a larger number of teeth than the first gear G1. The first gear G1 and the second gear G2 can be suitably used, for example, as a pinion gear and a side gear constituting a differential mechanism of a differential device.

The number of the teeth of the second gear G2 is larger than the number of the teeth of the first gear G1. Therefore, as shown in FIG. 2A, which is a sectional view of a tooth of the first gear G1, and FIG. 2B, which is a sectional view of a tooth of the second gear G2, a pitch circle P2 of the second gear G2 is located closer to a tooth top T2 side than a pitch circle P1 of the first gear G1.

Figure 2A:
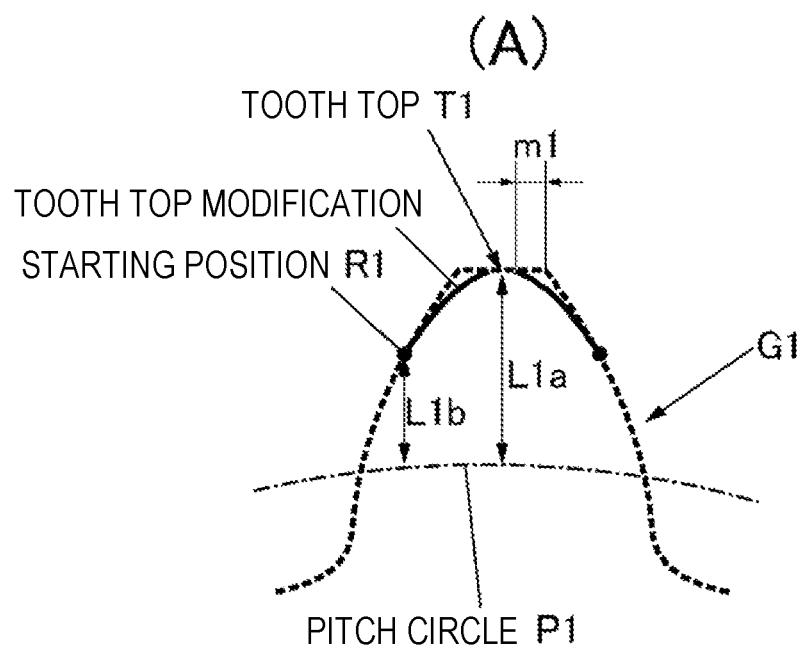
FIG. 2A is a sectional view of a tooth in the first gear in FIG. 1 cut along an arbitrary plane orthogonal to a tooth trace.
Figure 2B:
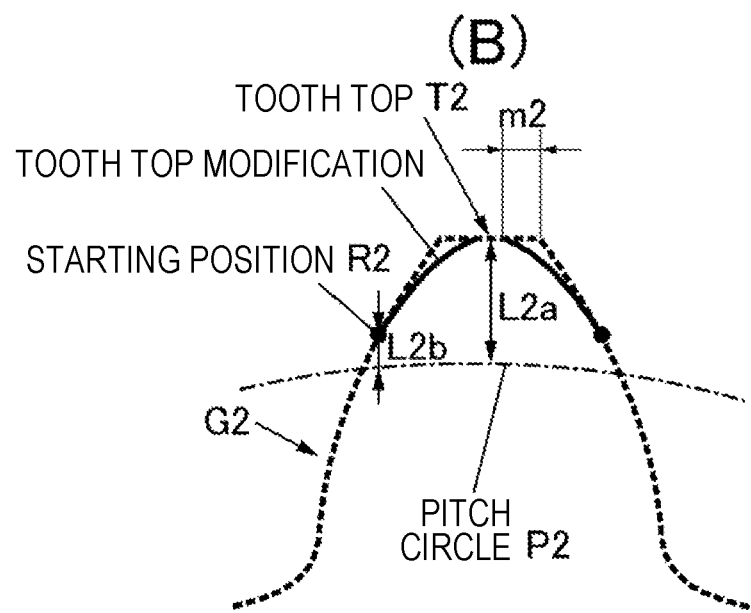
FIG. 2B is a sectional view of a tooth in the second gear in FIG. 1 cut along an arbitrary plane orthogonal to a tooth trace.

Moreover, to achieve smooth meshing of the bevel gear pair, each tooth of the first gear G1 is applied with tooth top modification which starts from a starting position R1 and extends to a tooth top T1 as shown in FIG. 2A, and each tooth of the second gear G2 is applied with tooth top modification which starts from a starting position R2 and extends to the tooth top T2 as shown in FIG. 2B.

In order to maximize an effect of the tooth top modification, it is desirable to bring the starting positions R1 and R2 of the tooth top modification closer to the pitch circles P1 and P2. However, when the starting positions R1 and R2 of the tooth top modification are too close to the pitch circles P1 and P2, a meshing ratio will decrease. Therefore, in the second gear G2 in which the pitch circle P2 is located closer to the tooth top than the pitch circle P1 of the first gear G1, a region where the tooth top modification can be applied is limited compared to the first gear G1.

Besides, since the starting positions of the tooth top modification of the both gears G1 and G2 are related to each other in terms of achieving the smooth meshing, the starting position R1 of the tooth top modification of the first gear G1 cannot be determined independently of the starting position R2 of the tooth top modification of the second gear G2. However, in conventional tooth top modification, the starting positions R1 and R2 of the tooth top modification of the both gears G1 and G2 that mesh with each other in the bevel gear pair are not defined in relation to each other, which makes setting of the tooth top modification of the both gears G1 and G2 difficult.

In light of this point, the present invention has been made to make a ratio of a distance L1b from the pitch circle P1 to the starting position R1 of the tooth top modification to a distance L1a from the pitch circle P1 to the tooth top T1 in the first gear G1 larger than a ratio of a distance L2b from the pitch circle P2 to the starting position R2 of the tooth top modification to a distance L2a from the pitch circle P2 to the tooth top T2 in the second gear G2.

Figure 3A:
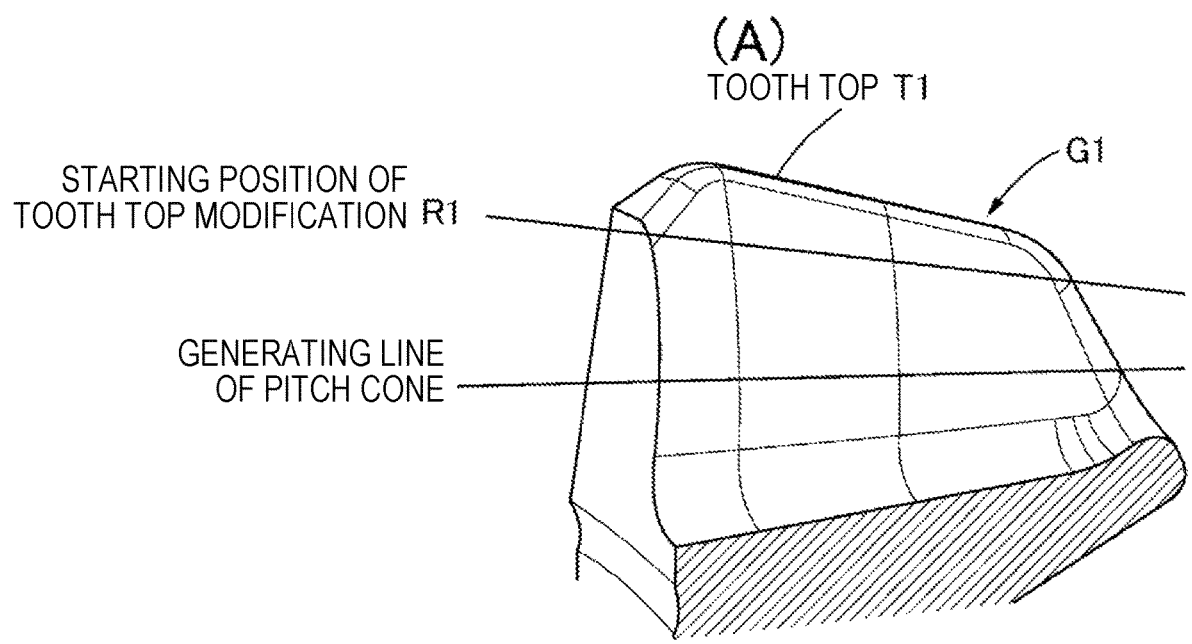
FIG. 3A is a perspective view showing a position of a generating line of a pitch cone and a starting position of tooth top modification of a tooth in the first gear in FIG. 1.
Figure 3B:
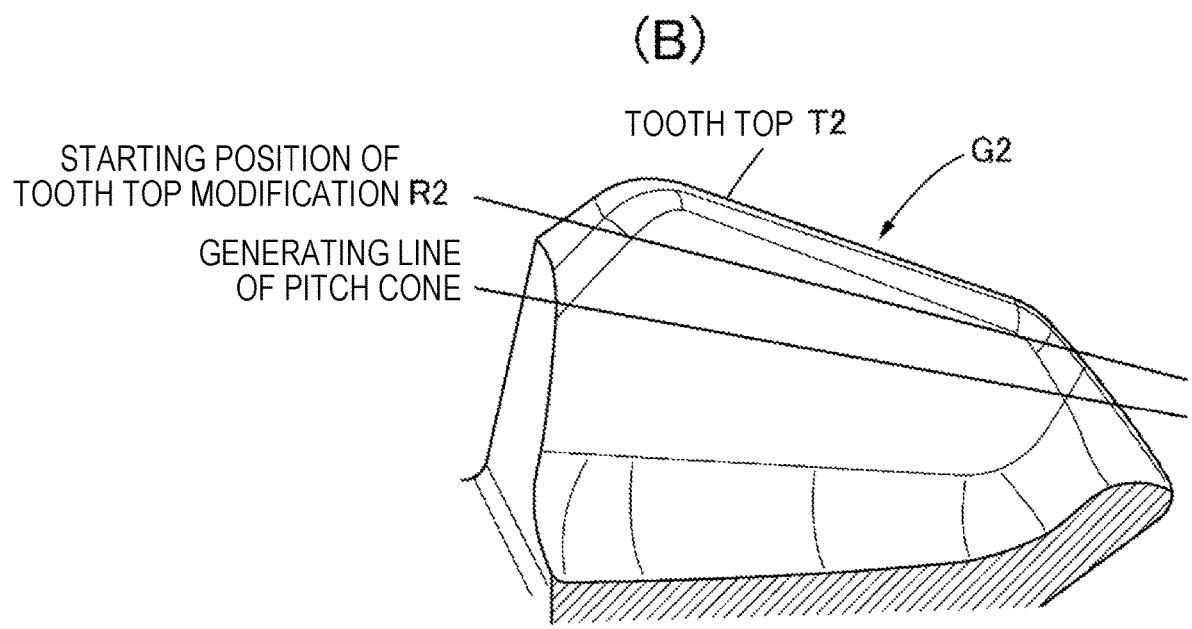
FIG. 3B is a perspective view showing a position of a generating line of a pitch cone and a starting position of tooth top modification of a tooth in the second gear in FIG. 1.

Such tooth top modification in the present invention is applied to each tooth of the bevel gear pair over the entire length of the tooth in a tooth trace direction as shown in FIGS. 3A and 3B, which are perspective views of one tooth in the first gear G1 and one tooth in the second gear G2.

Figure 4:
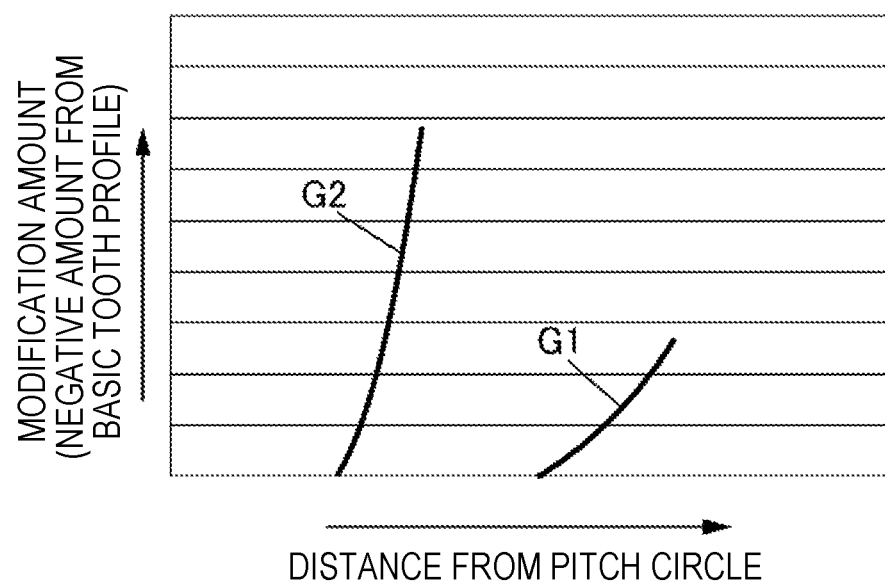
FIG. 4 is a graph showing a relationship between a distance from a pitch circle and a modification amount of the first gear and the second gear.

As described above, due to the limitation of a region in the second gear where the tooth top modification can be applied, a range in the second gear where the tooth top modification can be applied is smaller than a range in the first gear where the tooth top modification can be applied. So, as shown in FIG. 4, which is a graph showing a relationship between a distance from a pitch circle and a modification amount in the first gear G1 and the second gear G2, a modification amount m2 of the tooth top modification in the second gear G2 in FIG. 2B is made large compared to a modification amount m1 of the tooth top modification in the first gear G1 in FIG. 2A. Thus, even under the circumstances that the region in the second gear where the tooth top modification can be applied is limited, the limitation of the region where the tooth top modification can be applied is compensated so that the effect of the tooth top modification can be maximized.

Furthermore, although a basic tooth profile of the first gear G1 and the second gear G2 is not particularly limited, in order to ensure satisfactory meshing of the first gear and the second gear in a part where the tooth top modification is not applied, it is desirable that the basic tooth profile is a spherical involute tooth profile or an octoid tooth profile.

Next, a description will be given of an effect of the present embodiment.

In the present embodiment, the ratio of the distance L1b from the pitch circle P1 to the starting position R1 of the tooth top modification to the distance L1a from the pitch circle P1 to the tooth top T1 in the first gear G1 is set larger than the ratio of the distance L2b from the pitch circle P2 to the starting position R2 of the tooth top modification to the distance L2a from the pitch circle P2 to the tooth top T2 in the second gear G2. Therefore, even under the circumstances that the region in the second gear where the tooth top modification can be applied is limited, it is possible to bring the starting position R2 of the tooth top modification of the second gear G2 closer to the pitch circle P2 within the region, while distancing the starting position R1 of the tooth top modification in the first gear G1 from the pitch circle P1 more than the starting position R2 of the tooth top modification in the second gear G2. Consequently, the effect of the tooth top modification can be maximized while ensuring the meshing ratio of the bevel gear pair so that the smooth meshing is achieved. As a result, a life span of the bevel gear pair can be prolonged.

Besides, when the first gear G1 is used as the pinion gear constituting the differential mechanism of the differential device, and the second gear G2 is used as the side gear constituting the differential mechanism, the effect of the tooth top modification can be maximized while ensuring a meshing ratio of the pinion gear and the side gear constituting the differential mechanism of the differential device.

Moreover, when the basic tooth profile of the first gear G1 and the second gear G2 is the spherical involute tooth profile or the octoid tooth profile, it is possible to ensure the satisfactory meshing of the first gear G1 and the second gear G2 in the part where the tooth top modification is not applied.

Furthermore, by making the modification amount m2 of the tooth top modification of the second gear G2 large compared to the modification amount m1 of the tooth top modification of the first gear G1, even under the circumstances that the region in the second gear where the tooth top modification can be applied is limited as described above, the limitation of the region where the tooth top modification can be applied is compensated so that the effect of the tooth top modification can be maximized.

Although the embodiments of the present invention have been described above, it is to be noted that the present invention should not be limited to the embodiments, and various design modifications thereto may be made without departing from the gist of the present invention.

For example, the bevel gear pair in FIG. 1 comprises straight teeth but the bevel gear pair may comprise curved teeth.

The invention claimed is:

1. A bevel gear pair comprising a first gear and a second gear that mesh with each other, the second gear having a larger number of teeth than the first gear, wherein
 each of the first gear and the second gear is applied with tooth top modification, and
 a ratio of a distance from a pitch circle to a starting position of the tooth top modification to a distance from the pitch circle to a tooth top in the first gear is larger than a ratio of a distance from a pitch circle to a starting position of the tooth top modification to a distance from a pitch circle to a tooth top in the second gear.

2. The bevel gear pair according to claim 1, wherein the first gear is a pinion gear constituting a differential mechanism of a differential device, and the second gear is a side gear constituting the differential mechanism.

3. The bevel gear pair according to claim 2, wherein a modification amount of the tooth top modification in the second gear is larger than a modification amount of the tooth top modification in the first gear.

4. The bevel gear pair according to claim 2, wherein a basic tooth profile of the first gear and the second gear is a spherical involute tooth profile or an octoid tooth profile.

5. The bevel gear pair according to claim 1, wherein a basic tooth profile of the first gear and the second gear is a spherical involute tooth profile or an octoid tooth profile.

6. The bevel gear pair according to claim 5, wherein a modification amount of the tooth top modification in the second gear is larger than a modification amount of the tooth top modification in the first gear.

7. The bevel gear pair according to claim 1, wherein a modification amount of the tooth top modification in the second gear is larger than a modification amount of the tooth top modification in the first gear.

* * * * *